United States Patent
Grevsen et al.

(10) Patent No.: US 7,967,550 B2
(45) Date of Patent: Jun. 28, 2011

(54) WIND TURBINE WITH A REFRIGERATION SYSTEM AND A METHOD OF PROVIDING COOLING OF A HEAT GENERATING COMPONENT IN A NACELLE FOR A WIND TURBINE

(75) Inventors: John K. Grevsen, Viby J (DK);
Srikanth Narasimalu, Singapore (SG);
Jesper Nyvad, Egå (DK); Poul Torben Tietze, Brabrand (DK); Anand Bahuguni, Singapore (SG);
Krishnamoorthi Sivalingam, Singapore (SG)

(73) Assignee: Vestas Wind Systems A/S, Randers SV (DK)

( * ) Notice: Subject to any disclaimer, the term of this patent is extended or adjusted under 35 U.S.C. 154(b) by 101 days.

(21) Appl. No.: 12/620,833

(22) Filed: Nov. 18, 2009

(65) Prior Publication Data
US 2010/0150704 A1 Jun. 17, 2010

Related U.S. Application Data

(60) Provisional application No. 61/199,649, filed on Nov. 18, 2008.

(30) Foreign Application Priority Data

Nov. 18, 2008 (DK) .................................. 2008 01603

(51) Int. Cl.
*F03D 11/00* (2006.01)

(52) U.S. Cl. .......... 415/1; 415/121.3; 415/175; 415/177
(58) Field of Classification Search ............. 415/1, 114, 415/121.3, 175–177
See application file for complete search history.

(56) References Cited

U.S. PATENT DOCUMENTS

| 7,111,668 | B2 * | 9/2006 | Rurup ........................ 165/134.1 |
| 7,168,251 | B1 * | 1/2007 | Janssen ........................ 60/641.1 |
| 7,748,946 | B2 * | 7/2010 | Wan .................................... 415/1 |
| 2008/0298964 | A1 * | 12/2008 | Rimmen ......................... 416/39 |

OTHER PUBLICATIONS

Dmitri Burdykin; Office Action and Search Report issued in related Denmark Patent Application No. PA 2008 01603; Jul. 3, 2009; 5 pages; Denmark Patent and Trademark Office.

* cited by examiner

*Primary Examiner* — Edward Look
*Assistant Examiner* — Jesse Prager
(74) *Attorney, Agent, or Firm* — Wood, Herron & Evans, L.L.P.

(57) ABSTRACT

The invention provides a wind turbine wind turbine with two vessels, each being interchangeably in thermal communication with a heating medium which transfers heat from a heat generating structure to the vessel, and with a cooling medium which transfers heat from the vessel to an ambient space. The vessels form a compression structure which form part of a refrigerating circuit which can circulate a working fluid between the compression structure, a condenser and an evaporator. At the evaporator, cooling effect is obtained based on evaporation of a working fluid, and the cooling can be utilized for cooling a heat generating component in the wind turbine.

15 Claims, 1 Drawing Sheet

WIND TURBINE WITH A REFRIGERATION SYSTEM AND A METHOD OF PROVIDING COOLING OF A HEAT GENERATING COMPONENT IN A NACELLE FOR A WIND TURBINE

CROSS-REFERENCE TO RELATED APPLICATIONS

This application claims priority under 35 U.S.C. §119(a) to DK Application No. PA 2008 01603, filed Nov. 18, 2008. This application also claims the benefit of U.S. Provisional Application No. 61/199,649, filed Nov. 18, 2008. Each of these applications is incorporated by reference herein in its entirety.

TECHNICAL FIELD

The present invention generally relates to cooling of a heat generating component in a wind turbine nacelle.

BACKGROUND

In wind turbines, the nacelle houses components and systems necessary for converting mechanical energy into electricity. The components may range from heavy duty generators, gearboxes, brakes and transformers to small electronic components. These systems and components generate a significant amount of heat inside the nacelle. The heat dissipates to outside ambient air for efficient operation of the nacelle components, however, high temperatures may reduce the efficiency or may even damage the wind turbine.

State of the art systems for removing heat from power electronics and heavy duty components include pumps or fans for circulating a heat exchange medium, e.g. water, oil, or air, between a region of relatively high temperature in, or near the component or system to be cooled and a region of relatively low temperature, where heat is typically dissipated through a heat exchanger which typically includes fins, tubes or similar structures which render the surface area large.

It will be appreciated that the existing systems for transporting thermal energy out of the nacelle housing sometimes lack efficiency, and only by use of very large heat exchangers or by use of a very heavy and thereby energy consuming flow of the heat exchange medium, sufficient cooling is provided in the nacelle. Limited space in the nacelle may further complicate implementation of large heat exchangers and large pipes or ducts for transporting the heavy flow of the heat exchange medium.

SUMMARY

It is an object of embodiments of the present invention to provide a cooling system for transporting thermal energy out of wind turbine nacelles, and in particular to increase the efficiency of the thermal transport. It is a further object of embodiments of the invention to provide a thermal transport system which takes less space than prior art systems, and which is less vulnerable to wear, which requires less maintenance than prior art systems, or which consumes less energy than prior art systems.

Generally, the present invention provides a wind turbine comprising two vessels, a condenser, an evaporator, a heating medium, a cooling medium, and a switching structure establishing interchangeable thermal communication between one of the vessels and the heating medium and the other vessel and the cooling medium, the vessels becoming a pressure increasing vessel by being in thermal communication with a heating medium and becoming a pressure decreasing vessel by being in thermal communication with a cooling medium, wherein each vessel comprises a flow structure providing one way flow of a working fluid between an inlet where the working fluid can enter the vessel and an outlet where the working fluid can escape the vessel, and each vessel forming part of a refrigeration circuit in which the outlet of the pressure increasing vessel can deliver the working fluid to a condenser, the condenser can deliver the working fluid to an evaporator, and the evaporator can deliver the working fluid to the inlet of the pressure decreasing vessel.

By means of the compression structure specified above, waste heat generated inside the wind turbine, and in particular inside the narrow nacelle of the wind turbine, e.g. by a gear, generator, power converter etc. is used to produce evaporation-based and therefore a relatively powerful cooling effect without implementation of noise and heat generating traditional compressor systems. Such traditional systems could potentially have increased the complexity of the wind turbine and thereby reduced the robustness of the wind turbine.

In addition, the evaporation-based cooling is established without the energy consumption which is traditionally known for compressor based systems.

The cooling effect can be used on electronic components inside the wind turbine, e.g. for cooling power electronics in the nacelle. Hence a dual effect of waste heat recovery as well as cooling of the nacelle components is achieved.

The vessels may be interchangeable between a first state where the first vessel is in thermal communication with the heating medium and the second vessel is in thermal communication with the cooling medium and a second state where the second vessel is in thermal communication with the heating medium and the first vessel is in thermal communication with the cooling medium.

In each of the two states, the inlet of the pressure increasing vessel is closed so that heating of this vessel causes a pressure increase and thus a compression of the working fluid in the vessel whereby the working fluid is propelled into the condenser where the heat generated from the compression can be delivered to an ambient space—preferably outside the wind turbine. The outlet of the pressure decreasing vessel is closed so that the pressure decrease caused by the cooling of this vessel increases the pressure difference over the condenser and evaporator.

The switching between the states may be carried out by at least four traditional valves, e.g. servo valves or electrically operated valves of other known kind. The switching could also be carried out by use of a so called 4/2 way valve mechanism etc, and the shifting between the states may be controlled by a control system based on the flow in the refrigeration circuit, based on the need for cooling, or based on the available heating in the heat generating structure.

In practice, the system may comprise also more than two vessels, e.g. 3, 4, 5 or 6 vessels. The vessels could be of equal size or they could be of different size. Typically, the vessels would be made from a durable metal containing material or from a composite material.

The working fluid may comprise water, e.g. in combination with an anti-freezing compound, or it may be constituted completely by water. Alternatively, or additionally, the working fluid may be constituted by, or it may contain, refrigerants of the kind being known from compressor based refrigeration systems, e.g. $CO_2$, Freon, Propane etc.

It may be an advantage to provide fluid control in the refrigerating circuit. For this purpose, a throttling valve may be inserted between the condenser and the evaporator. In this way, a simple and efficient control of the cooling effect may be provided and the flow of the working fluid may be adapted to an actual production of thermal energy in the heat generating structure.

The heat generating structure may e.g. be constituted by a gear box, a generator, a transformer or other heat generating components or combinations of such components.

The heating medium may comprise oil, water, an anti-freezing compound etc. and the cooling medium may comprise water, an anti-freezing compound, anti-corrosive compounds or combinations thereof.

The condenser could advantageously be arranged in thermal communication with an environment which is normally cold relative to an internal environment in the nacelle. As an example, the condenser could be arranged on a top roof of the nacelle housing or generally on an exterior surface of the nacelle, on an outer surface of the tower of the wind turbine or on the ground adjacent to the wind turbine. In an alternative embodiment, the condenser forms part of the foundation of the wind turbine, or the waste heat is by other means transferred downwards, e.g. into the sea in wind turbines installed on water.

The cooling medium may be circulated in a cooling circuit which may comprise a cooling heat exchanger which, likewise the condenser, could be arranged in an environment which is cold relative to the internal environment. In one embodiment, the cooling heat exchanger and the condenser is formed in one part which can be affixed to an outer surface of the wind turbine. In one embodiment, at least one of the condenser and the cooling heat exchanger is in direct thermal conductive contact with, or forms part of, a wall of the nacelle or the tower so that the nacelle or tower becomes a heat sink into which the thermal energy may dissipate. Again, the heat exchanger may also cool the cooling medium by transporting the heat downwards, e.g. into the foundation of the wind turbine or into the sea in case of wind turbines on water.

The evaporator may be arranged in thermal communication with a heat producing component. As an example, the evaporator may form part of the heat producing component, e.g. by forming an integrated part of a transmission, generator etc.

The heat generating structure may e.g. provide in the range of 100-200 kW at a temperature between 80 and 90 degrees Celsius.

In a second aspect, the invention provides a method of cooling a heat producing component in a nacelle of a wind turbine, the method comprising:
  providing a refrigerating circuit which can circulate a working fluid between a compression structure, a condenser and an evaporator;
  providing the compression structure with a first vessel and a second vessel each comprising an flow structure for one way flow of the working fluid between an inlet where the working fluid can enter the vessel and an outlet where the working fluid can escape the vessel;
  providing a thermal exchange structure which can circulate an heating medium between a heat generating structure and the compression structure; and
  providing a cooling circuit which can circulate a cooling medium;
wherein each vessel is brought in thermal communication with the heating medium and the cooling medium by turns.

BRIEF DESCRIPTION OF THE DRAWING

Embodiments of the invention will be described with reference to the accompanying drawing in which.

DETAILED DESCRIPTION

Figure 1:
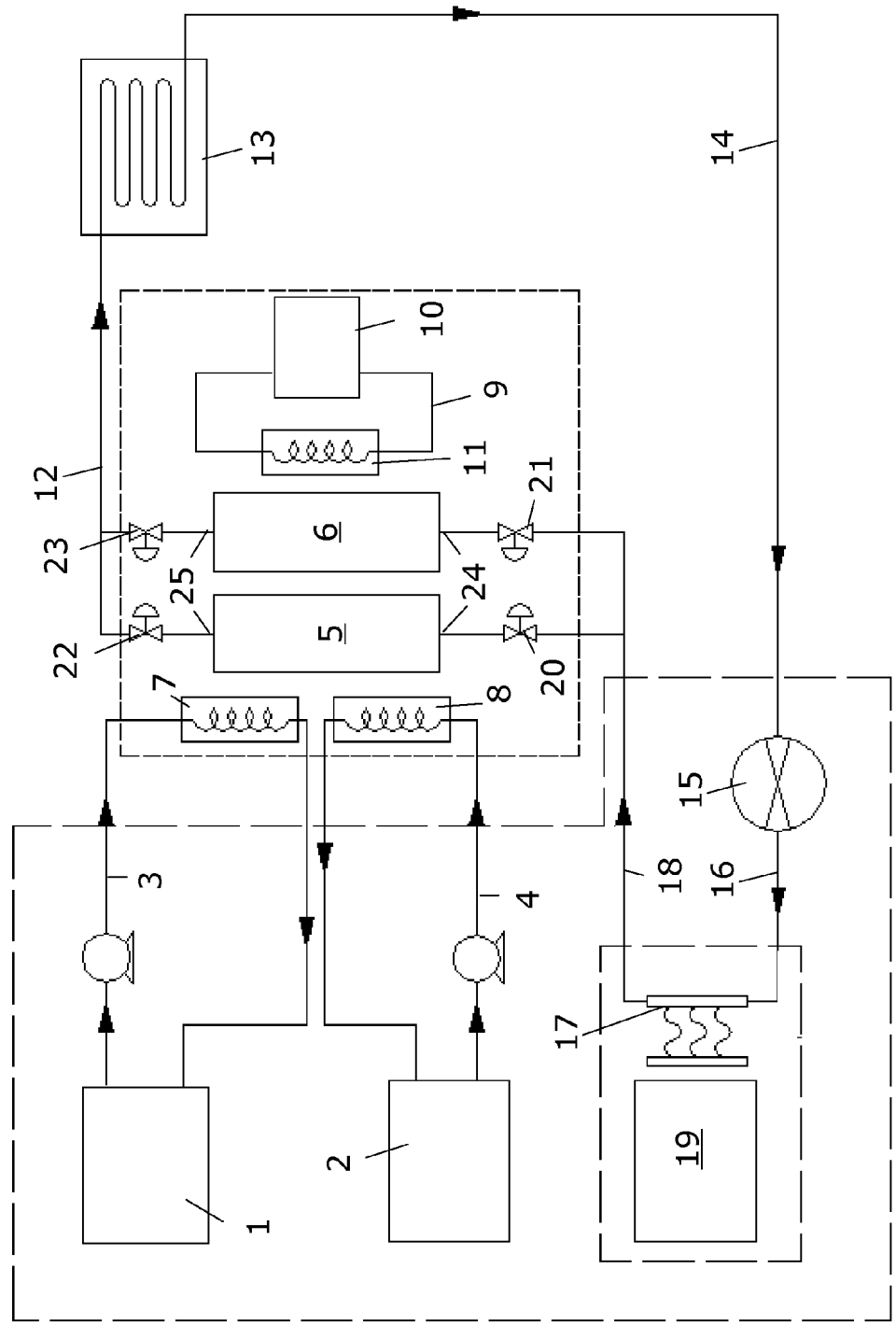
FIG. 1 illustrates diagrammatically a system for a wind turbine according to the invention.

In FIG. 1, the heat generating structure 1 is constituted by a gear box forming part of the drive train between the blades and the generator of the wind turbine, and further constituted by the generator 2.

The gear box 1 is cooled by a flow of oil in the conduit 3, and the generator 2 is cooled by a flow of water in the conduit 4. The conduits 3, 4 form part of a heating circuit in which the heat is transferred to one of the vessels 5, 6. In the illustrated state, the pressure increasing vessel 5 is adjacent to the heat convectors 7, 8, and the heat drawn from the gear box and from the generator therefore heats up working fluid contained in the pressure increasing vessel 5. This state can be switched so that the pressure increasing vessel 6 becomes adjacent to the heat convectors 7, 8, and the heat drawn from the gear box and from the generator therefore heats up working fluid contained in the pressure increasing vessel 6.

The cooling circuit 9 circulates a cooling medium between an exterior heat exchanger 10, which is located outside the wind turbine, and an interior heat exchanger 11, which is located inside the wind turbine. The interior heat exchanger is in thermal communication with one of the vessels 6 which thereby is cooled down and becomes the pressure decreasing vessel.

The pressure increasing vessel is in the following referred to as a "desorber" and the pressure decreasing vessel is in the following referred to as an "adsorber". The desorber/adsorber pair is in the following referred to as a "compressing structure". The adsorber and the desorber are inserted parallel to each other in a refrigerating circuit formed by the conduit 12 between the compressing structure and the condenser 13, a conduit 14 between the condenser 13 and a throttle valve 15, a conduit 16 between the throttle valve 15 and an evaporator 17, and a conduit 18 between the evaporator 17 and the compressing structure. The evaporator is in thermal communication with a power electronic component 19 and therefore provides evaporation-based cooling thereof.

The system comprises four valves 20, 21, 22, 23 which are controllable to provide one-way flow of the working fluid in the refrigerating circuit from the inlets 24 towards the outlets 25.

The system comprises a control system by which the valves can be controlled. In a first state the valves 20, 23 are closed simultaneously while the valves 21, 22 are open simultaneously, and in a second state, the valves 20, 23 are open simultaneously while the valves 21, 22 are closed simultaneously. The control system allows switching between the states. During switching, the desorber becomes adsorber and the adsorber becomes desorber since both the cooling and the heating circuits are rearranged to influence the other vessel.

What is claimed is:

1. A wind turbine comprising two vessels, a condenser, an evaporator, a heating medium, a cooling medium, and a switching structure establishing interchangeable thermal communication between one of the vessels and the heating medium and between the other vessel and the cooling medium, the vessels becoming a pressure increasing vessel by being in thermal communication with a heating medium and becoming a pressure decreasing vessel by being in thermal communication with a cooling medium, wherein each vessel comprises a flow structure providing one way flow of a working fluid between an inlet where the working fluid can enter the vessel and an outlet where the working fluid can escape the vessel, and each vessel forms part of a refrigeration circuit in which the outlet of the pressure increasing vessel is configured to deliver the working fluid to a condenser, the condenser is configured to deliver the working fluid to an evaporator, and the evaporator is configured to deliver the working fluid to the inlet of the pressure decreasing vessel.

2. A wind turbine according to claim 1, wherein the heating medium is configured to transfer heat from a heat generating structure housed in the wind turbine to the vessel.

3. A wind turbine according to claim 2, wherein the heat generating structure comprises a gear box, a generator, a transformer, or combinations thereof.

4. A wind turbine according to claim 1, wherein the heating medium comprises oil.

5. A wind turbine according to claim 1, wherein the cooling medium is configured to transfer heat from one of the vessels to an ambient space outside the wind turbine.

6. A wind turbine according to claim 5, wherein the cooling medium comprises water.

7. A wind turbine according to claim 1, wherein the working fluid comprises water.

8. A wind turbine according to claim 1, further comprising a throttling valve between the condenser and the evaporator.

9. A wind turbine according to claim 1, the nacelle comprising a nacelle housing forming an internal environment, the condenser being in thermal communication with an environment being cold relative to the internal environment.

10. A wind turbine according to claim 9, the cooling medium being circulated in a cooling circuit comprising a heat exchanger in thermal communication with an environment being cold relative to the internal environment.

11. A wind turbine according to claim 1, wherein the evaporator is arranged in thermal communication with a heat producing component.

12. A wind turbine according to claim 1, wherein the heat generating structure provides in the range of 100-200 kW at a temperature between 80 and 90 degrees Celsius.

13. A method of cooling a heat producing component in a nacelle of a wind turbine, the method comprising:
   providing a refrigerating circuit configured to circulate a working fluid between a compression structure, a condenser and an evaporator,
   providing the compression structure with a first vessel and a second vessel each comprising an flow structure for one way flow of the working fluid between an inlet where the working fluid is configured to enter the vessel and an outlet where the working fluid is configured to escape the vessel,;
   providing a thermal exchange structure configured to circulate an heating medium between a heat generating structure and the compression structure; and
   providing a cooling circuit configured to circulate a cooling medium;
wherein each vessel is brought in thermal communication with the heating medium and the cooling medium by turns.

14. A method according to claim 13, wherein the cooling circuit is configured to transport heat out of the wind turbine.

15. A method according to claim 13, wherein the condenser is arranged outside the wind turbine.

* * * * *

UNITED STATES PATENT AND TRADEMARK OFFICE
CERTIFICATE OF CORRECTION

| | | |
|---|---|---|
| PATENT NO. | : 7,967,550 B2 | Page 1 of 1 |
| APPLICATION NO. | : 12/620833 | |
| DATED | : June 28, 2011 | |
| INVENTOR(S) | : John K. Grevsen et al. | |

It is certified that error appears in the above-identified patent and that said Letters Patent is hereby corrected as shown below:

Title Page item 57 at column 2, "a wind turbine wind turbine with", should read -- a wind turbine with --.

Title Page item 57 column 2, "structure which form part", should read -- structure which forms part --.

At column 3, line approx. 27, "the cooling heat exchanger and the condenser is formed", should read -- the cooling heat exchanger and the condenser are formed --.

At column 3, line approx. 52, "an flow structure", should read -- a flow structure --.

At column 3, line approx. 57, "an heating medium", should read -- a heating medium --.

At column 6, line 13, "comprising an flow structure", should read -- comprising a flow structure --.

At column 6, line 17, "escape the vessel,;", should read -- escape the vessel; --.

At column 6, line 19, "an heating medium", should read -- a heating medium --.

Signed and Sealed this
Twentieth Day of December, 2011

David J. Kappos
*Director of the United States Patent and Trademark Office*